US007322586B1

(12) United States Patent
    Zettel

(10) Patent No.: US 7,322,586 B1
(45) Date of Patent: Jan. 29, 2008

(54) NON-POWERED TRANSPORTABLE CART

(76) Inventor: Daniel M. Zettel, P.O. Box 399, West Branch, MI (US) 48661

( * ) Notice: Subject to any disclaimer, the term of this patent is extended or adjusted under 35 U.S.C. 154(b) by 0 days.

(21) Appl. No.: 11/156,817

(22) Filed: Jun. 20, 2005

(51) Int. Cl.
    B62B 1/00 (2006.01)
(52) U.S. Cl. .............................. 280/47.26; 280/47.24; 280/47.34; 414/490
(58) Field of Classification Search ............ 280/47.24, 280/47.34, 47.26, 47.131, 47.23; 414/490
    See application file for complete search history.

(56) References Cited

U.S. PATENT DOCUMENTS

| 362,868 | A | * | 5/1887 | Roberts ................... 280/47.24 |
| 1,255,484 | A | * | 2/1918 | Stephens .................... 414/457 |
| 2,425,892 | A | | 8/1947 | Michaels |
| 2,646,910 | A | | 7/1953 | Wiershing |
| 2,714,460 | A | | 8/1955 | Cook |
| 3,643,993 | A | * | 2/1972 | Asadurian ................ 294/68.26 |
| 3,716,253 | A | * | 2/1973 | Gniffke et al. ........... 280/416.2 |
| 3,879,053 | A | * | 4/1975 | Chvala ...................... 280/6.15 |
| 3,912,092 | A | | 10/1975 | Bolton |
| 4,042,141 | A | | 8/1977 | Schweigert |
| 4,063,616 | A | * | 12/1977 | Gutierrez ..................... 182/17 |
| 4,114,770 | A | | 9/1978 | Jordan |
| 4,214,776 | A | | 7/1980 | Nurse |
| 4,288,134 | A | | 9/1981 | Knaack |
| 4,385,414 | A | * | 5/1983 | Damico ...................... 16/35 R |
| 4,417,738 | A | * | 11/1983 | Kendall ................... 280/43.17 |
| 4,842,139 | A | | 6/1989 | Krieg |
| 5,064,338 | A | | 11/1991 | Lawrence |
| 5,364,224 | A | | 11/1994 | Padgett |
| 5,538,088 | A | | 7/1996 | Wait |
| 5,580,208 | A | | 12/1996 | Miller |
| 5,749,589 | A | * | 5/1998 | Hopkins et al. ......... 280/47.34 |
| 5,807,053 | A | | 9/1998 | Pride |
| 5,980,008 | A | * | 11/1999 | Stoever ................. 312/351.12 |
| 6,213,053 | B1 | * | 4/2001 | Lammers ................. 119/51.01 |
| 6,439,585 | B1 | * | 8/2002 | Tan ......................... 280/47.26 |
| 6,507,975 | B2 | * | 1/2003 | Maupin et al. ................ 16/34 |
| 6,962,370 | B2 | * | 11/2005 | Simpson .................... 280/789 |
| 2003/0015851 | A1 | * | 1/2003 | Hahn ...................... 280/47.24 |

* cited by examiner

Primary Examiner—Christopher P. Ellis
Assistant Examiner—John D Walters
(74) Attorney, Agent, or Firm—Harness, Dickey & Pierce, P.L.C.

(57) ABSTRACT

A cart for supporting cargo thereon has wheels at one end and a handle at an opposite end to allow the cart to be transported manually on a ground surface. The cart has an upper bracket and a pair of laterally spaced lower brackets on one of its sides for mounting the cart to a three-point hitch mechanism, and/or a pair of fork lift brackets to allow the cart to be lifted from the ground surface and transported over the ground surface.

18 Claims, 7 Drawing Sheets

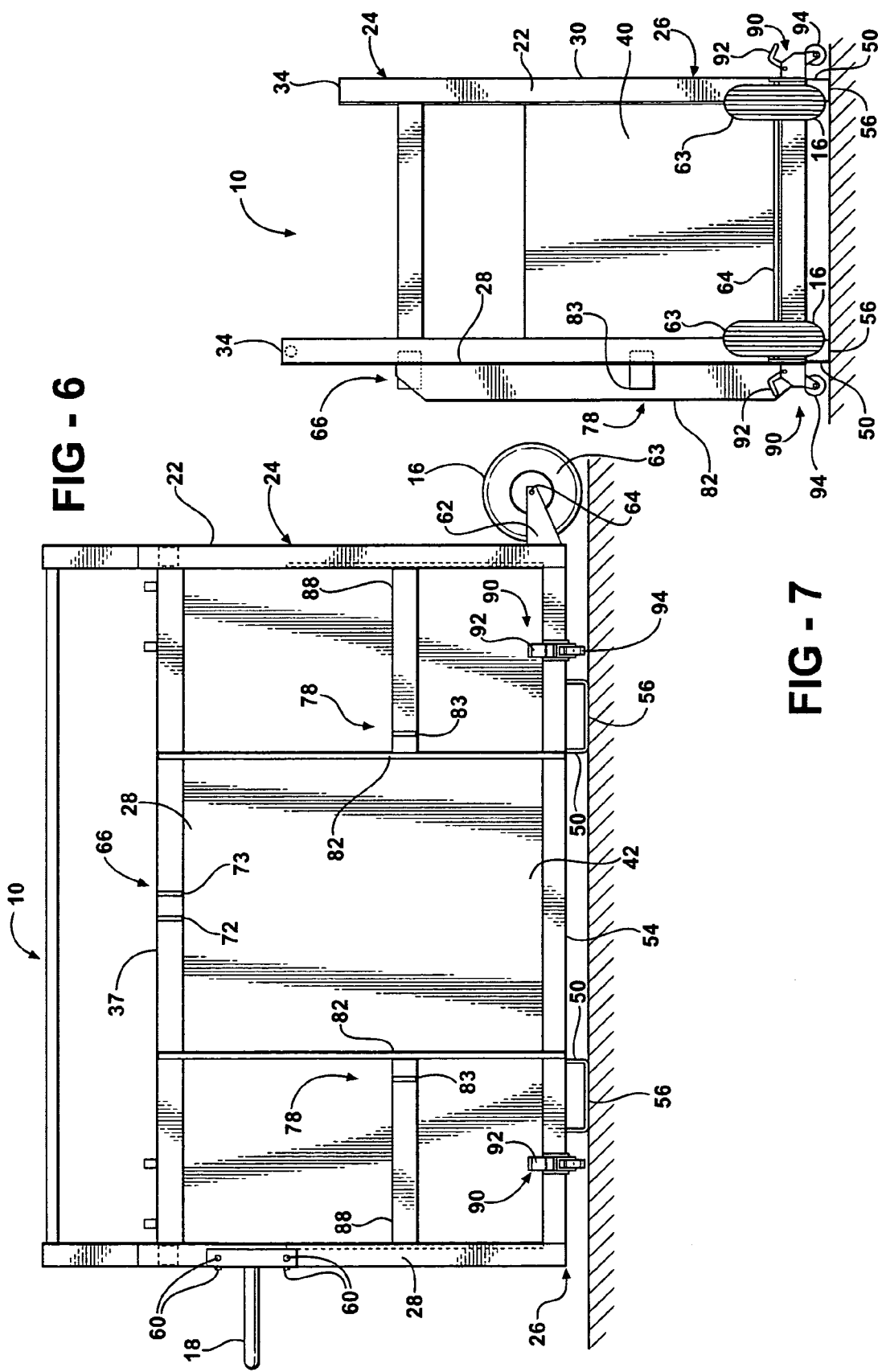

NON-POWERED TRANSPORTABLE CART

BACKGROUND OF THE INVENTION

1. Field of the Invention

This invention relates generally to non-powered transportable carts, and more particularly to non-powered carts transportable manually on a ground surface and via a vehicle with the cart raised above the ground surface.

2. Related Art

It is often desirable to use machinery to facilitate transporting bulky and/or heavy cargo from one place to another. Commonly, tractors are used to tow wheeled trailers via a three-point hitch mechanism to facilitate moving cargo from one place to another. The trailers are typically relatively large, making them useful for towing the cargo via the tractor, however, not useful for transporting the cargo without the aid of the tractor, or some other powered vehicle. It is also known to attach buckets or other forms of non-wheeled containers to tractors via a three-point hitch mechanism to facilitate moving cargo from one place to another. Unfortunately, the buckets and containers are also not useful for transporting the cargo without the aid of the tractor.

SUMMARY OF THE DISCLOSURE

A non-powered transportable cart mountable to a three-point hitch mechanism has a frame with a side extending between opposite ends. A platform is carried by the frame for supporting cargo thereon. A handle is attached to one end of the frame, and a pair of rotatable wheels is operably attached to the other end of the frame opposite the handle. The handle is manually liftable to move the cart along a ground surface by rolling the cart via the wheels. The side of the cart has an upper bracket operably attached thereto for attachment to a central link of the three-point hitch mechanism. A pair of lower brackets is operably attached to the side a predetermined distance beneath the upper bracket for attachment to a pair of laterally spaced draft links of the three-point hitch mechanism. Accordingly, the cart is transportable manually via the handle and wheels, and is also transportable while raised above the ground surface via the three point hitch mechanism.

Another embodiment provides a non-powered cart transportable manually on a ground surface and by a fork lift with the cart raised above the ground surface. The cart has a frame with a side extending between opposite ends and a platform carried by the frame for supporting cargo thereon. A handle is attached to one end of the frame, and a pair of rotatable wheels having an outer diameter rotatable about an axis is operably attached adjacent the end of the frame opposite the handle. The axis about which the wheels rotate is spaced from the bottom surface a distance greater than the outer diameter of the wheels so that the wheels are substantially spaced from the ground surface when the bottom surface is engaged with the ground surface. The wheels are brought into rolling engagement with the ground surface when the cart is tilted relative to the ground surface. A pair of fork lift brackets is attached to the frame in laterally spaced relation from one another to provide channels to receive a pair of forks of the fork lift to facilitate transporting the cart via the fork lift.

BRIEF DESCRIPTION OF THE DRAWINGS

Some of the objects, features and advantages of the invention will become readily apparent in view of the following detailed description of the presently preferred embodiments and best mode, appended claims, and accompanying drawings, in which:

FIG. 6 is a right side view of the cart with a set of casters shown in a retracted position;

FIG. 7 is a front view of the cart while in a stationary position on a ground surface showing a wheel assembly thereof.

DETAILED DESCRIPTION OF PREFERRED EMBODIMENTS

Figure 1:
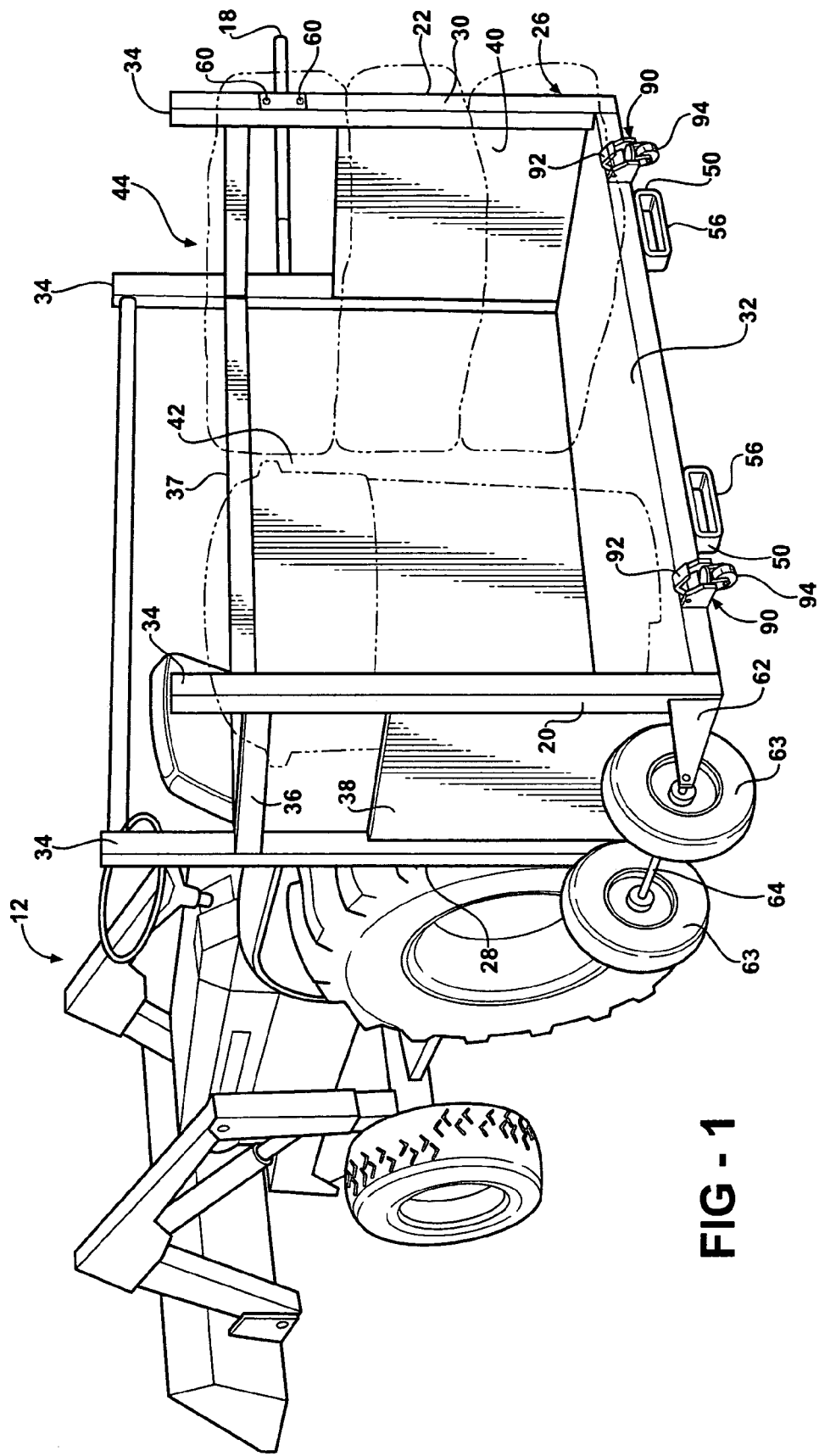
FIG. 1 is a perspective view of one presently preferred embodiment of a cart attached to a tractor.
Figure 2:
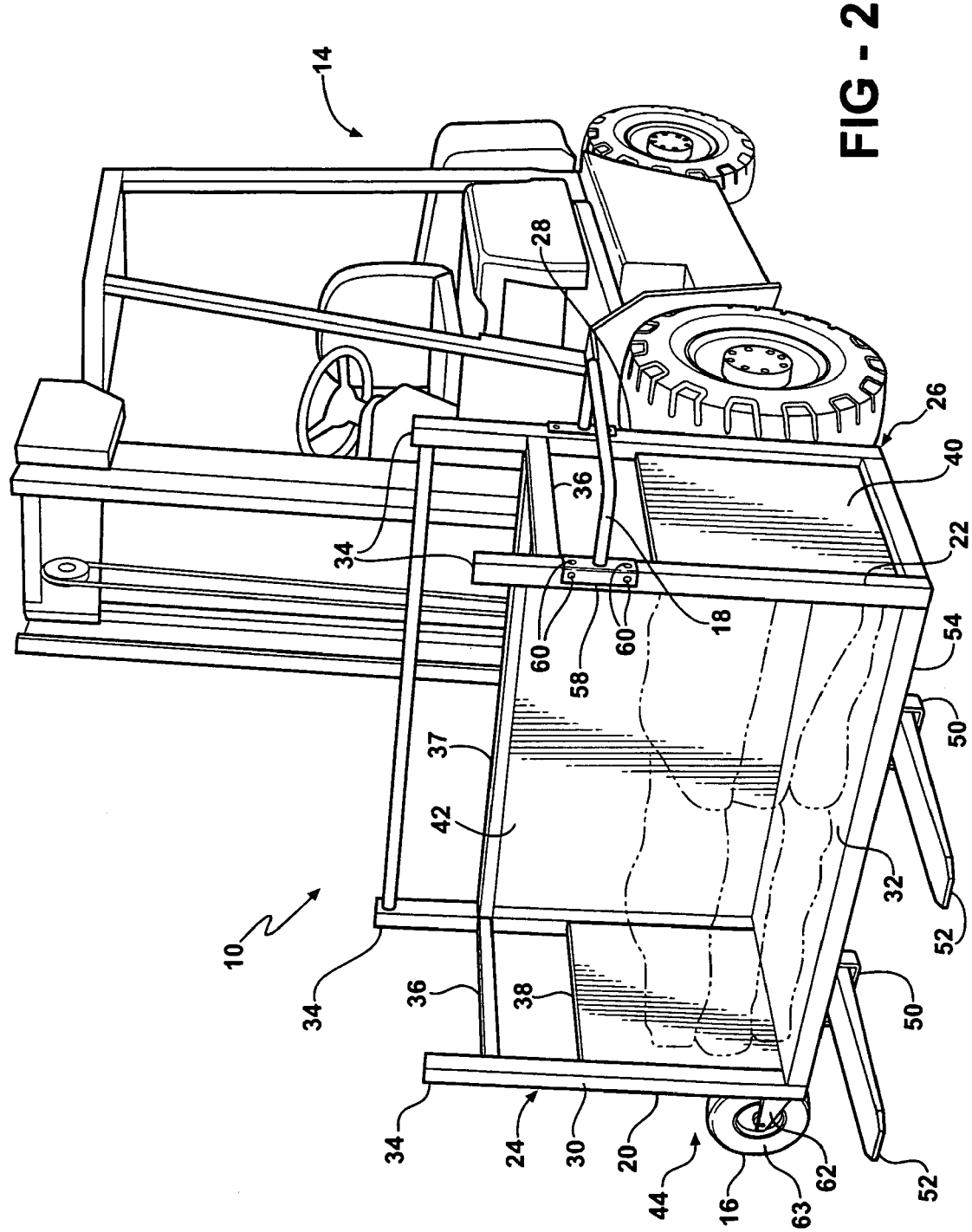
FIG. 2 is a perspective view of the cart being transported by a fork lift.
Figure 3:
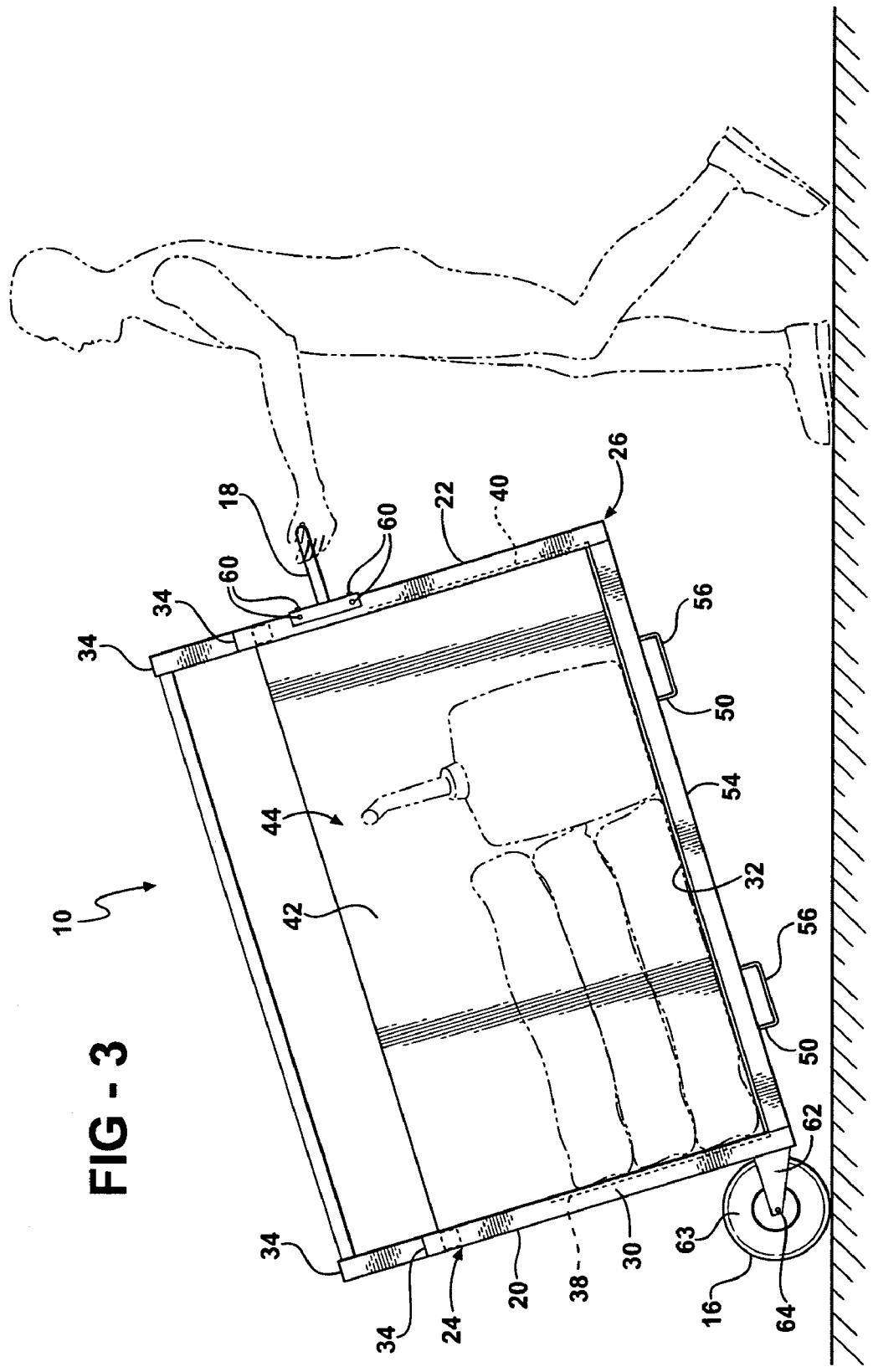
FIG. 3 is a left side view of the cart being transported by hand.

Referring in more detail to the drawings, FIGS. 1-3 show one presently preferred embodiment of a non-motorized cart 10 being transported by a tractor 12 (FIG. 1), a fork lift 14 (FIG. 2), and manually by hand (FIG. 3). The cart 10 is preferably constructed from a durable metal, such as steel or aluminum, thereby enhancing the capability of supporting and transporting relatively heavy cargo loads and prolonging the useful life of the cart 10. Various components of the cart 10, however, could be fabricated from high strength polymeric materials, if desired. To facilitate transporting the cart 10 by hand, a pair of wheels 16 is operably attached to a front end 20 of the cart 10 and a handle is operably attached to a rear end 22 of the cart 10. Additionally, as shown in FIGS. 1 and 2, the cart 10 is adapted to be suspended above a ground surface via the tractor 12 or forklift 14 to facilitate transporting the cargo over any surface that is navigable by the tractor 12 or forklift 14. As such, the cart 10 can be maneuvered over a wide variety of terrains, ranging from hard, smooth ground surfaces, such as concrete, to relatively soft, undulating surfaces, such as loose dirt, mud and/or sand, for example.

Figure 5:
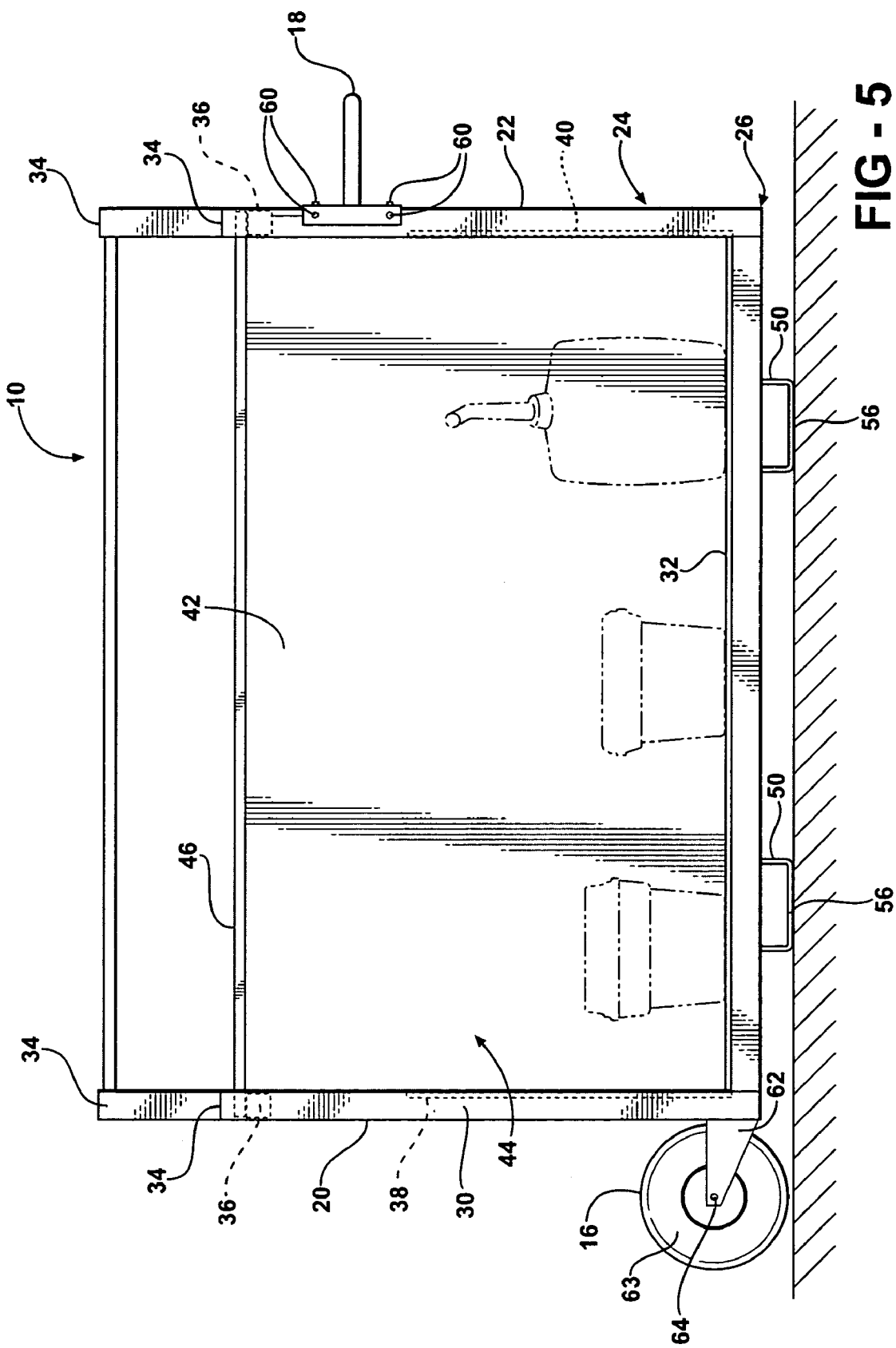
FIG. 5 is a left side view of the cart shown in a stationary position on a ground surface.

The cart 10 has a body 24 defined in part by a frame 26. The frame 26 has opposite right and left sides 28, 30, respectively, extending between the front and rear ends 20, 22. The frame 26 preferably carries a platform 32 for supporting cargo thereon. Right and left sides 28, 30 and front and rear ends 20, 22 may define a cargo space therebetween. More specifically, frame 26 may define a horizontally open cargo space extending from front end 20 to rear end 22 and from right side 28 to left side 30. The frame 26 preferably has a pair laterally spaced side supports 34 extending upwardly from the platform 32 adjacent at least one of the ends, and shown here, by example, as extending upwardly from corners of both the front and rear ends 20, 22. An upper cross rail 36 preferably extends between each pair of side supports 34 generally parallel to the platform 32 to provide added rigidity to the frame 26. A transverse support beam 37 preferably extends between at least one pair of opposite side supports 34, shown here, by example and without limitation, as being coplanar with the cross rails 36. The front and rear side supports 34 preferably have front and rear walls 38, 40, respectively, attached thereto, and preferably at least one side wall 42 extends between respective ones of the front and rear side supports 34 at frame left side 28, while frame right side 30 may be horizontally open between front and rear ends 20, 22, to define an at least partially enclosed cargo carrying space 44. Additionally, as shown in FIG. 5, a cover or top platform 46 can preferably be removably placed on the cross rails 36 in generally parallel relation to the platform 32 to substantially enclose the cargo space 44, and to provide an additional support surface 48 for cargo, if desired. Additional platforms or shelves can be provided within the cargo space 44, as desired, to best accommodate the various shapes and sizes of cargo being carried within the space 44.

The cart 10 preferably has a pair of fork lift brackets 50 attached to the frame 26 laterally spaced and generally parallel to one another to provide channels for receiving forks 52 of the fork lift 14. The fork lift brackets 50 extend generally along at least a portion of a width of the cart 10 defined between the sides 28, 30, and are represented here, by example, as being attached to a lower surface 54 of the frame 26. The brackets 50 preferably extend downwardly from the platform 32 to define a bottom surface 56 of the cart 10 for engaging the ground surface when the cart 10 is in a stationary rest position. As such, the platform 32 of the cart 10 is preferably maintained spaced from or off the ground surface when the cart 10 is resting on the ground surface.

The handle 18 is represented here, by way of example and without limitation, as an elongated, generally c-shaped single piece of tubing operably attached to one end of the frame 26, and shown here as the rear end 22. The handle 18 has opposite ends 58 attached to the rear side supports 34, such as via threaded fasteners 60, for example. Though the handle 18 is represented here as a single piece of material, it could be comprised of separate laterally spaced hand grips (not shown) attached to the side supports 34, or the handle could be formed as one piece with the frame 26, if desired. Additionally, a second handle (not shown) could be attached to the front end 20 of the cart 10, if desired, thereby facilitating maneuvering of the cart 10 by hand from either end 20, 22.

The wheels 16 are operably attached adjacent one end of the cart 10, shown here as the front end 20 opposite the handle 18. To facilitate attaching the wheels 16 to the cart 10, a pair of wheel mounts 62 is preferably attached to the front end 20 of the frame 26, shown here as being attached to the side support rails 34. The wheel mounts 62 extend outwardly from the side supports 34 in generally mirrored relation to one another and preferably have axially aligned openings adjacent their free ends to receive an axle 64. The wheels 16 are adapted for journaled receipt on the axle 64 generally adjacent the wheel mounts 62 so that the wheels 16 are laterally spaced from one another a suitable distance to provide stability to the cart 10 while it is being transported by hand via the handle 18. It should be recognized the wheels could be independently supported for rotation by replacing the single axle with separate journal supports, if desired.

As best shown in FIG. 5, the wheels 16 are preferably sized to be slightly spaced from the ground surface when the bottom surface 56 of the cart 10 is resting on the ground surface. Accordingly, an axis about which the wheels rotate, defined here by the axle 64, is preferably spaced from the ground engaging bottom surface 56 of a distance greater than the outer radius of the wheels 16, preferably ½ to 3" inches greater than the outer radius of the wheels 16. As such, the wheels 16 do not interfere with the ability of the cart 10 to reset on the bottom surfaces 56, and thus, do not promote movement of the cart 10 while it is resting on the ground surface. As such, depending on the spacing of the wheels from the ground surface, and the overall length of the cart 10, the cart 10 preferably needs to be titled about ½ to 3 degrees or more relative to the ground surface for the wheels 16 to come into rolling engagement with the ground surface. The wheels 16 preferably have appropriately sized pneumatic tires 63 to provide a smooth ride to the cart, particularly over bumpy ground surfaces, such as gravel or loose dirt, though solid tires could be used, if desired.

Figure 4:
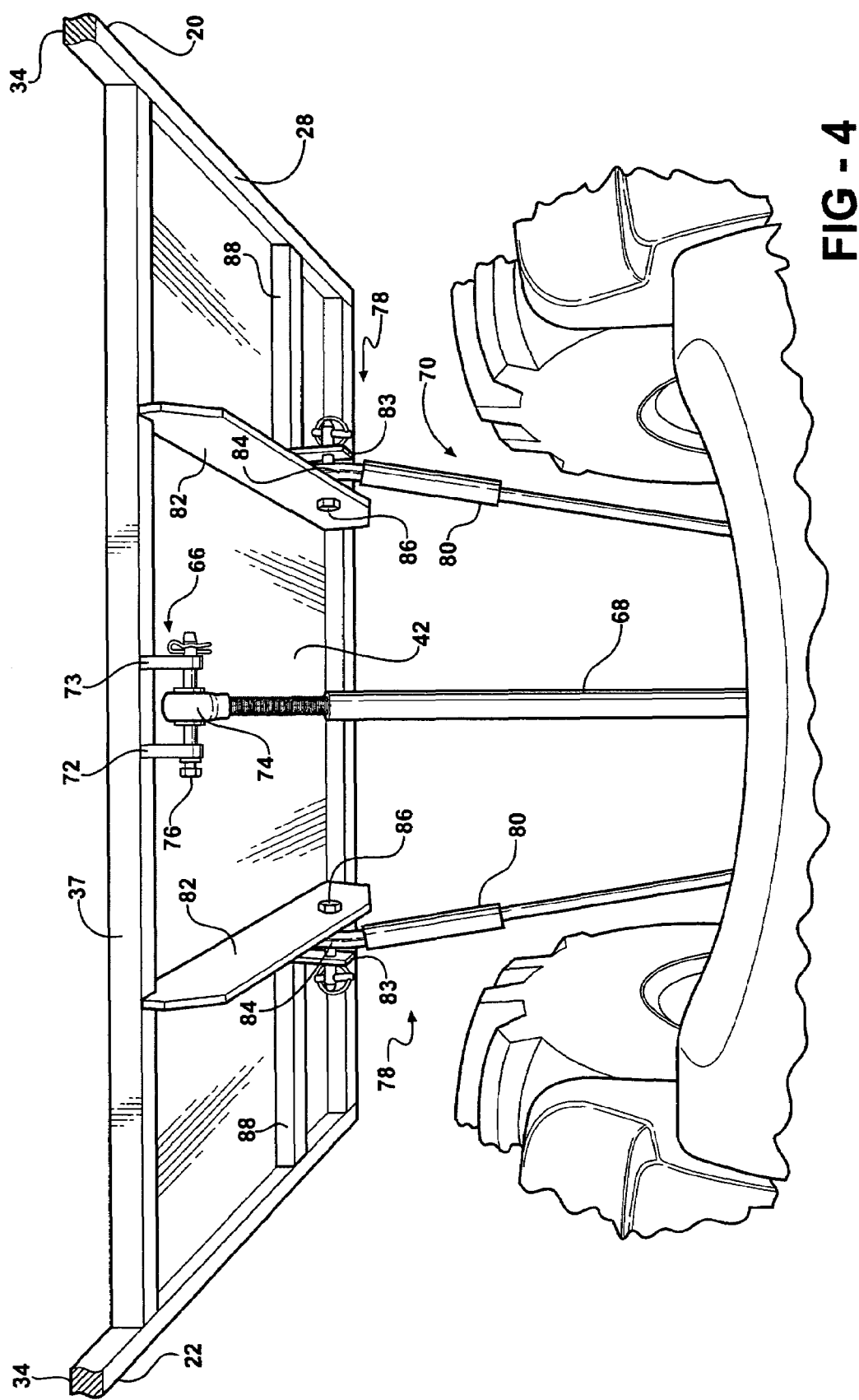
FIG. 4 is a fragmentary right side perspective view of a three-point hitch mechanism shown attaching the cart to the tractor.
Figure 6A:
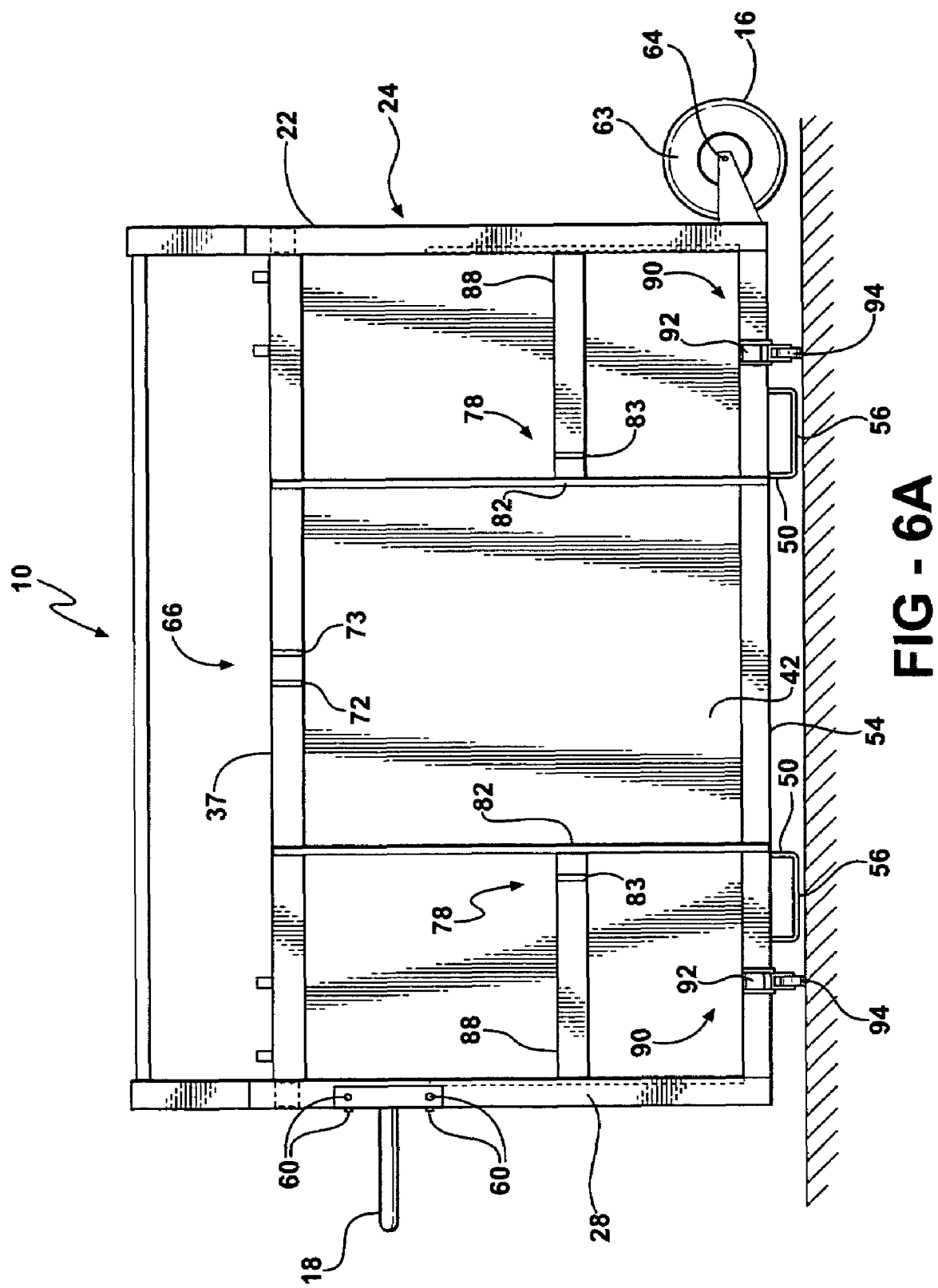
FIG. 6A is a view similar to FIG. 6 showing the casters in an extended position.

As shown in FIGS. 4 and 6, one side of the cart has an upper bracket 66 preferably attached to the upper support beam 37, preferably via a weld joint, for releasable attachment of a center link 68 (FIG. 4) of a three-point hitch mechanism 70 thereto. The upper bracket 66 is preferably centrally located between the ends 20, 22 of the cart 10 to facilitate maintaining the cart 10 in a balanced attitude while it is being transported via the three-point hitch mechanism 70. The upper bracket 66 preferably has a pair of outwardly extending flanges 72, 73 spaced from one another to receive a pivot joint 74 of the center link 68 therebetween. The center link 68 is preferably releasably attached for pivotal movement relative to the upper bracket 66 via pin 76 extending through an aperture of the pivot joint 74 and openings in the flanges 72, 73.

A pair of lower brackets 78 are attached to the side 28, preferably via a weld joint, below the upper bracket 66 a predetermined distance for releasable pivotal attachment of a pair of laterally spaced left and right draft links 80 (FIG. 4) of the three-point hitch mechanism 70. The lower brackets 78 are arranged relative to the upper bracket 66 per known engineering specifications to receive the left and right draft links 80 depending on the category of three-point hitch mechanism being used. The lower brackets 78 preferably have pairs of outwardly extending flanges 82, 83 spaced from one another to receive a pivot joint 84 of the respective draft link 80 therebetween. One of the flanges 82 is represented here, by way of example and without limitation, as an elongated flange extending between the support beam 37 and the platform 32. The other flanges 83 are represented, by way of example and without limitation, as being attached to mid-supports 88 extending laterally between the flanges 82 and the side supports 34. The draft links 80 are preferably releasably attached between the flanges 82, 83 for pivotal movement relative to the lower brackets 78 via pins 86 extending through an aperture of each pivot joint 84 and openings in the flanges 82, 83.

Accordingly, the cart 10 is adapted for attachment to the three point hitch mechanism 70 via the upper and lower brackets 66, 78, respectively. The cart 10, upon being attached to the tractor 12, can then be raised off the ground surface via the hydraulic three-point hitch mechanism 70 and transported to any location the tractor 12 is capable of driving. Thus, the cart 10 facilitates transporting heavy loads of various types of cargo from one place to another, regardless of the terrain over which the cargo needs to travel. The cart 10 can then be removed from the tractor 12 and either stowed, or further transported by hand (FIG. 3) via the handle 18 and wheels 16. If the cart 10 is to be transported by hand, the cart is simply tilted forward via the handle 18, thereby bringing the wheels 16 into rolling engagement with the ground surface to allow the cart to be pushed or pulled along the ground surface. Otherwise, the cart 10 can be transported off the ground surface via the fork lift 14 (FIG. 2) by extending the forks 52 generally transversely between the ends 20, 22 and through the channels of the fork lift brackets 50.

As shown in FIGS. 1, 6, 6A and 7, the cart 10 preferably has a plurality of caster assemblies 90 attached thereto, with the caster assemblies 90 preferably being arranged for movement between a retracted position out of engagement with the ground surface and an extended position for rolling engagement with the ground surface. The caster assemblies 90, such as those readily available from Sears under item #00924934000, Mfr. model #24934, for example, are shown as being attached, such as by way of fasteners or a weld joint, for example, to the right and left sides 28, 30 in laterally opposed pairs. The caster assemblies 90 are preferably actuatable, such as via a foot pedal 92, to lower rotatable wheels 94 below a plane defined by the bottom surface 56 into engagement with the ground surface (FIG. 6A), thereby raising the bottom surface 56 of the cart 10 from engagement with the ground surface. With the wheels 94 engaging the ground surface, the cart 10 can be readily rolled on the wheels 94 in a zero radius manner, or otherwise, thus allowing the cart 10 to be maneuvered in tight quarters. When the cart 10 is moved to the desired location, the foot pedals 92 can be actuated manually, such as by lifting with an upper portion of a person's foot, to move the wheels 94 to their retracted position (FIGS. 6 and 7) above the plane defined by the bottom surface 56 and out of engagement with the ground surface. As such, the cart 10 retains its stationary rest position on the ground surface. Otherwise, rather than retracting the wheels 94 of the caster assemblies 90 to prevent movement of the cart 10, the wheels 94 could be arranged to lock to prevent the wheels 94 from rolling, as is known in caster assemblies. As such, the caster assemblies 90 could remain in their extended position with the wheels 94 being locked to inhibit movement of the cart 10. It should be recognized that the caster assemblies 90 can be located other than as shown, and that more or fewer caster assemblies could be used.

The embodiments of the cart 10 and associated transporting vehicles 12, 14 discussed above are intended to be illustrative of some presently preferred embodiments, and are not limiting. Various modifications within the spirit and scope of the invention will be readily apparent to those skilled in the art. For example, the size and arrangement of compartments and shelving of the cart 10 can be varied to suit any number of applications, and a handle could be attached to the front end 20 with wheels arranged adjacent the rear end 22 to facilitate moving the cart by hand in opposite directions. Also, a handle and wheels could be attached on the opposite sides 28, 30 of the cart 10. The invention is defined by the claims that follow.

I claim:

1. A non-powered manually transportable cart mountable to a three-point hitch mechanism, comprising:
    a frame having first and second sides extending between first and second ends;
    a platform carried by said frame for supporting cargo, said frame and said platform defining a horizontally open cargo space extending from said first end to said second end and from said first side to said second side;
    a handle attached to said first end of said frame;
    a pair of wheels operably attached adjacent said second end of said frame opposite said handle to facilitate transporting said cart by hand on a ground surface;
    an upper bracket operably attached to said first side of said frame, said upper bracket arranged for attachment to a center link of the three-point hitch mechanism;
    a pair of lower brackets operably attached to said first side a predetermined distance beneath said upper bracket, said lower brackets arranged for attachment to a pair of laterally spaced draft links of the three-point hitch mechanism; and
    a pair of fork lift brackets attached to said frame in laterally spaced relation from one another to provide channels to receive a pair of forks of a fork lift to facilitate transporting said cart via the fork lift, said fork lift brackets having a bottom surface arranged to engage the ground surface when the cart is in a rest position.

2. The cart of claim 1 wherein said fork lift brackets are arranged to receive the forks transversely between said ends.

3. The cart of claim 1 wherein said wheels are spaced from the ground surface when said bottom surface is engaged with the ground surface.

4. The cart of claim 1 further comprising a pair of caster assemblies attached to opposite sides of said frame for rolling engagement with the ground surface.

5. The cart of claim 4 wherein the cart has a bottom surface and said caster assemblies are movable between a retracted position and an extended position, said wheels being raised above a plane defined by said bottom surface and out of engagement with the ground surface when in the retracted position and lowered below said plane when in the extended position for rolling engagement with the ground surface.

6. A cart transportable manually on a ground surface and mountable to a three-point hitch mechanism for transporting the cart via the three-point hitch mechanism in a raised position above the ground surface, comprising:
    a frame having first and second sides extending between first and second ends and a bottom surface arranged for engagement with the ground surface, said frame defining a horizontally open cargo space extending from said first end to said second end and from said first side to said second side;
    a handle attached to one end of said frame;
    a pair of wheels having an outer radius rotatable about an axis, said wheels being operably attached adjacent the end of said frame opposite said handle so that said axis is spaced from said bottom surface a distance greater than said outer radius so that said wheels are substantially spaced from the ground surface when said bottom surface is engaged with the ground surface, said wheels being brought into rolling engagement with the ground surface when the cart is tilted relative to the ground surface;
    an upper bracket attached to said first side of said frame, said upper bracket arranged for attachment to a central link of the three-point hitch mechanism; and
    a pair of lower brackets attached to said first side a predetermined distance beneath said upper bracket, said lower brackets arranged for attachment to a pair of laterally spaced draft links of the three-point hitch mechanism.

7. The cart of claim 6 further comprising a pair of fork lift brackets attached to said frame in laterally spaced relation from one another to provide channels to receive a pair of forks of a fork lift to facilitate transporting said cart via the fork lift.

8. The cart of claim 6 further comprising a pair of walls extending upwardly from said ends, a wall extending upwardly from said first side, and a cover extending over said walls generally covering said open cargo space, said second side being generally horizontally open between said first and second ends.

9. The cart of claim 6 wherein said wheels on said cart are out of rolling engagement from the ground surface when said cart is transported via the three-point hitch mechanism.

10. The cart of claim 6 further comprising a pair of caster assemblies attached to opposite sides of said frame for rolling engagement with the ground surface.

11. The cart of claim 10 wherein said caster assemblies are movable between a retracted position out of engagement with the ground surface and an extended position for rolling engagement with the ground surface.

12. A non-motorized cart transportable manually on a ground surface and by a fork lift in a raised position above the ground surface, comprising:
   a frame having first and second sides extending between first and second ends and a bottom surface arranged for engagement with the ground surface, said frame defining a horizontally open cargo space extending from said first end to said second end and from said first side to said second side;
   a handle attached to one end of said frame;
   a pair of wheels having an outer radius rotatable about an axis, said wheels being operably attached adjacent the end of said frame opposite said handle so that said axis is spaced from said bottom surface a distance greater than said outer radius so that said wheels are substantially spaced from the ground surface when said bottom surface is engaged with the ground surface, said wheels being brought into rolling engagement with the ground surface when the cart is tilted relative to the ground surface; and
   a pair of fork lift brackets attached to said frame in laterally spaced relation from one another to provide channels to receive a pair of forks of the fork lift to facilitate transporting said cart via the fork lift.

13. The cart of claim 12 further comprising an upper bracket attached to said first side of said frame, said upper bracket arranged for attachment to a central link of a three-point hitch mechanism and a pair of lower brackets attached to said first side a predetermined distance beneath said upper bracket, said lower brackets arranged for attachment to a pair of laterally spaced draft links of the three-point hitch mechanism.

14. The cart of claim 12 wherein said fork lift brackets are arranged to receive the forks transversely between said ends.

15. The cart of claim 12 further comprising a pair of caster assemblies attached to said first and second sides of said frame for rolling engagement with the ground surface.

16. The cart of claim 15 wherein said caster assemblies are movable between a retracted position out of engagement with the ground surface and an extended position for rolling engagement with the ground surface.

17. The cart of claim 1 further comprising a pair of wheel mounts, said wheel mounts having a first end attached to said frame and said wheels being operably attached to a second end, wherein said wheel mounts outwardly extend from said frame in a generally mirrored relation to one another.

18. The cart of claim 12 further comprising a pair of wheel mounts, said wheel mounts having a first end attached to said frame and said wheels being operably attached to a second end, wherein said wheel mounts outwardly extend from said frame in a generally mirrored relation to one another.

* * * * *